Patented Nov. 1, 1932

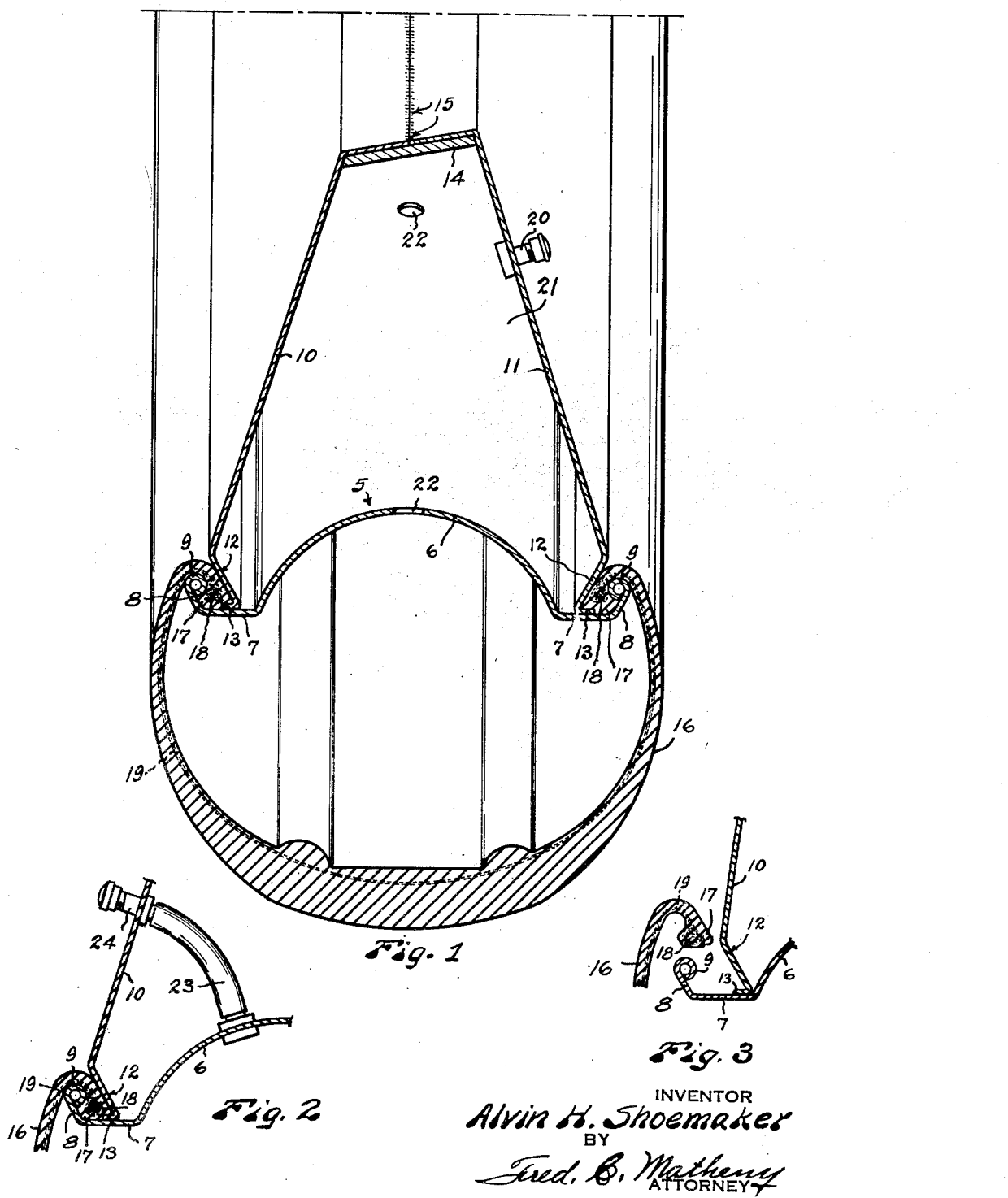

1,885,484

UNITED STATES PATENT OFFICE

ALVIN H. SHOEMAKER, OF SEATTLE, WASHINGTON

PNEUMATIC TIRE AND WHEEL

Application filed October 31, 1931. Serial No. 572,314.

My invention relates to pneumatic tires and to wheels for operatively receiving and holding the same and the general object of my invention is to provide a radial cord pneumatic tire having bead portions which are elastic and free to stretch and contract, together with simple and efficient wheel and rim means adapted to grip and securely hold the edges of the tire, the gripping of the tire edges being produced by air pressure exerted between the two side discs of a double disc wheel.

Another object of my invention is to provide a tire which may be reduced in diameter after it has been cured and before it is put into use thereby placing the rubber within said tire under compression.

A further object of my invention is to provide a tire which is adapted to make an air seal contact with a rim, whereby said tire may be used without an inner tube.

In the manufacture of pneumatic tires, if the usual non-elastic or substantially non-elastic bead rings are left out of the bead portions of the tire at the time the tire is molded the process of manufacture is greatly simplified and the cost of production of the tires is very much reduced and the tires are left with relatively flexible bead portions instead of with stiff non-flexible bead portions thus making the tires easier and less cumbersome to handle in marketing. Dispensing with the usual non-elastic bead rings also makes it possible to reduce the diameter of the tires when they are placed in service thus compressing the rubber.

In my present application I provide a tire which is made without the usual non-elastic bead rings and in which the bead portions of the tire are arranged to be securely clamped to the rim by pneumatic means in such a manner as to form an air seal and in which the clamping means serves also to hold the tire to a reduced diameter whereby the rubber of which said tire is formed and especially the tread portion thereof may be maintained under compression when in service thereby giving greater wearing qualities and rendering the tire more resistant to puncture and more self sealing in the event it is punctured.

A more specific object of my invention is to provide a wheel rim having its edges curved inwardly toward the axis of said rim and a tire having elastic edge portions extending around the outsides of said inwardly curved rim portions and a wheel having an air pressure chamber provided with resilient sides arranged to be expanded by internal air pressure into locking engagement relative to the tire bead portions.

In pneumatic tires I find that if radial cord reinforcing alone is used in the tire and all longitudinal and diagonal reinforcing is omitted I am able to produce a tire which has relatively thin side walls, and one which has great flexibility, and which will pass over small obstructions very easily, and which is free running and which is economical on power and has no interply friction and therefore does not tend to heat when in use. I also find that when radial cord reinforcing is used and longitudinal and diagonal reinforcing is done away with the tires are liable to be unstable and subject to side sway and shimmy and it becomes necessary to spread the bead portions of the tires widely apart. When the tire bead portions are thus spread widely apart it is necessary to provide a type of bead receiving means which is especially adapted to grip and hold the bead portions of the tire. The necessity for this specially constructed holding means is greater on account of the thinness and flexibility of the side walls of the tire and on account of the fact that internal air pressure in a radial cord tire will not effectively hold the tire bead portions outwardly against bead receiving means if said tire bead portions are widely spread apart. A specially constructed tire bead receiving and holding means is also essential when an air seal is to be formed at this location and no inner tube is to be used in the tire. My bead engaging and holding means is especially designed for use with a radial cord tire in which the bead portions are widely spread apart and is not pratical for use in connection with a cenventional type of tire having longitudinal and diagonal reinforcing, due partly to the fact that the side walls of longitudinally and diagonally reinforced tires are too thick and too stiff to be drawn around rim members in the manner herein disclosed and will cut and chafe at the locations where they pass around such rim members.

Other and more specific objects of my invention will be apparent from the following description taken in connection with the accompanying drawing.

In the drawing Figure 1 is a fragmentary sectional view of a wheel and tire constructed in accordance with my invention.

Fig. 2 is a fragmentary sectional view of a modified form of the same.

Fig. 3 is a fragmentary sectional view of the bead portion of the tire and adjacent portion of the wheel showing the tire bead portion detached from the rim.

Like reference numerals designate like parts throughout the several views.

Referring to the drawing 5 designates a rim member having an annularly channeled central portion 6 and having flattened portions 7 toward the sides thereof and having its edges 8 bent toward the axis of said rim member and provided with rolled portions 9.

Two wheel discs 10 and 11 have inclined peripheral portions 12 terminating in outwardly bent flanges 13 which are operatively disposed in contact with the flattened rim portions 7 whereby the rim member is supported by the said wheel discs 10 and 11. The wheel discs 10 and 11 are of resilient material and their outer edges are free to move toward and away from the portions 8. Toward their centres the wheel discs 10 and 11 are bent within a supporting band 14 and are tapered to fit onto a tapered wheel hub, not shown. The two abutting edges of the discs 10 and 11 within the band 14 are welded or soldered, as indicated at 15 to render them air tight.

The tire 16 used in combination with this wheel is of radial cord construction free from diagonal or longitudinal binder the cords extending directly crosswise of the tire from one bead portion to the other. The bead portions 17 of the tire have bodies 18 of fabric or like material embedded therein which serve as means to which the cords 19 may be anchored but which leave said tire bead portions free to expand and contract sufficiently to permit the tire to be reduced in size and to be easily put on and taken off. When the tire is in place on the rim it is desirable that the width of the tire at the base, namely at the location where it passes over the outer sides of the roll portions 9 shall be greater than the depth of the air cavity as measured from the inner wall of the tread portion to a straight line drawn through the two roll portions 9.

The tire is preferably constructed to a larger diameter than it is to be when in service and the diameter of said tire is reduced when it is placed on the wheel thus placing the rubber, especially in the tread portion of the tire, under compression whereby said rubber will have greater wearing qualities and will tend to close up any cuts or punctures which may be made therein. The tire beads are molded in the shape shown in Fig. 3 whereby they will readily fit the rim.

In applying the tire to the rim the bead portions of the tire are passed over the outer sides of the rim and placed inside the inwardly bent rim portions 8 the side wall portions of the tire adjacent the beads extending around the rolled edges 9. While the tire is being placed on the rim the peripheral portions of the wheel discs are pressed inwardly into the position shown in Fig. 3, to allow sufficient space for insertion of the tire beads between the disc portions 12 and the rim portions 8 and 9. After the tire bead portions 17 have been properly positioned on the rim air under pressure is admitted, through a valve 20, to the chamber 21 between the two wheel discs 10 and 11 thus exerting an expanding pressure between said two wheel discs and causing the portions 12 to be forced outwardly and bind tightly against the bead portions 17 of the tire, said bead portions of the tire thus being tightly gripped between the disc portions 12 and the rim portions 8 and 9 so that no air is allowed to escape at this point thus making it possible to use the tire without an inner tube.

It will be noted that the bead portions of the tire are larger than the passageways between the disc portions 12 and the roll portions 9 and consequently they are very firmly held and can not pull out.

In the preferred form of the invention shown in Fig. 1, holes 22 are provided in the rim 5 so that the air cavity in the tire is connected with the air chamber 21 in the wheel and both may be inflated simultaneously through the valve 20. In the alternative form shown in Fig. 2, these holes are omitted and the tire cavity is connected, preferably by a flexible hose type connection 23 with another valve 24. This leaves the tire cavity and the wheel cavity pneumatically separate, the wheel cavity being inflated through a valve corresponding to the valve 20, not shown in Fig. 2.

The radial cord construction of the tire makes possible the light thin side walls. The efficient clamping and holding of the bead portions makes it possible to dispense with the inner tube and the wheel and rim structure are light and strong in construction thus combining to form a very efficient and cheap wheel construction which is very light in weight in proportion to its size and strength.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In devices of the class described, a wheel having relatively movable members forming a pneumatic chamber, a rim on said wheel, and a tire having bead portions protruding between said movable members and parts of said rim whereby air pressure within said pneumatic chamber will move said members into clamping engagement relative to said tire bead portions, the air cavity within said tire being in communication with said pneumatic chamber.

2. In devices of the class described, a wheel having relatively movable side discs forming a pneumatic chamber therebetween, a rim on said wheel, and a tire having bead portions extending between the peripheral portions of said side discs and parts of said rim whereby air pressure within said pneumatic chamber will move said side discs and clamp said tire bead portions.

3. In devices of the class described, a wheel having a rim and having two side discs provided with relatively movable peripheral portions engaging said rim and forming a pneumatic chamber, and a tire having bead portions extending over the outer edges of said rim and terminating between the peripheral portions of said side discs and said rim whereby air pressure within said chamber will move said movable side discs and clamp said bead portions of said tire.

4. In a tire and wheel of the class described, a wheel having two relatively movable side discs forming an air tight chamber therebetween, a rim on the peripheries of said side discs, said rim having tire bead engaging edge portions extending inwardly toward the axis thereof, and a pneumatic tire having bead portions extending between the peripheral portions of said side discs and the inwardly extending bead engaging edges of said rim whereby air pressure between said discs will move said discs tightly against said tire bead portions.

5. In a tire and wheel of the class described, a wheel having two relatively movable side discs forming an air tight chamber therebetween, a rim on the peripheries of said discs, said rim having edge portions extending inwardly toward the axis thereof, and a tire having bead portions extending between the peripheral portions of said side discs and the inwardly bent edges of said rim whereby air pressure between said discs will move said discs against said tire bead portions, said rim having openings therein establishing air communication between said air tight chamber in said wheel and the interior of said tire.

6. In a tire and wheel of the class described, a wheel having two relatively movable side discs forming an air tight chamber therebetween, a rim on the peripheries of said discs, said rim having edge portions extending inwardly toward the axis thereof, and a radial cord tire having relatively elastic bead portions extending between the peripheral portions of said side discs and the inwardly bent edges of said rim whereby air pressure between said discs will move said discs against said tire bead portions and securely clamp said bead portions, the width of the base of said tire at the location where it passes over the outside of said rim being greater than the depth of the air cavity of the tire.

7. In a tire and wheel of the class described, a wheel having two side discs which diverge from the hub outwardly and have convergent bead engaging portions near their periphery, the peripheral portions of said discs being movable toward and away from each other and said discs cooperating to form an air chamber therebetween, a circular rim mounted on said discs, said rim having side flanges which are inwardly bent toward the axis thereof and have rolled portions on their extremities, a tire having elastic bead portions extending around said rolled portions of said rim and into the space between said rim flanges and said discs, and a valve in said discs permitting introduction of air under pressure whereby said discs will be forced apart and said tire bead portions securely clamped.

8. In a tire and wheel of the class described, a wheel having two side discs which diverge from the hub outwardly and have convergent bead engaging portions near their periphery, said tire engaging portions terminating in flanges at substantially right angles to the general plane of the discs, the peripheral portions of said discs being movable toward and away from each other and said discs cooperating to form an air chamber therebetween, a circular rim mounted on said discs, said rim having side flanges which extend inwardly toward the axis thereof and have rolled portions on their extremities and said rim having relatively cylindrical portions adjacent said inwardly bent side flanges, and a tire having elastic edge portions extending around said rolled portions of said rim and into the space between said rim flanges and said tire engaging portions of said wheel discs whereby air pressure between said discs will securely clamp said tire edge portions.

9. In a tire and wheel of the class described, a wheel having two side discs which diverge from the hub outwardly and have convergent bead engaging portions near their periphery, said bead engaging portions terminating in flanges at substantially right angles to the general plane of the discs, the peripheral portions of said discs being movable toward and away from each other and said discs cooperating to form an air chamber therebetween, a circular rim mounted on said discs, said rim having side flanges which are inwardly bent toward the axis thereof and have rolled portions on their extremities and said rim having relatively cylindrical portions adjacent said inwardly bent side edges for engagement with the terminal flanges of said discs, and a radial cord tire having relatively elastic bead portions extending around the rolled portions of said rim and into the space between said rim flanges and the bead engaging peripheral portions of said discs, whereby air under pressure between said discs will expand said discs and securely clamp said tire bead portions, the width of the base of said tire at the location where it passes over the outermost parts of said rim being greater than the depth of the air cavity as measured between the inner wall of the tread portion of said tire and a straight line passing through the bead portions of the tire.

10. In devices of the class described, a wheel having relatively movable members forming a pneumatic chamber, a rim on said wheel, a tire having bead portions protruding between said movable members and parts of said rim whereby air pressure within said pneumatic chamber will move said members into clamping engagement relative said tire bead portions, the air cavity in said tire being pneumatically separate from said pneumatic chamber, air valve means connected with said pneumatic chamber, and other air valve means connected with the air cavity of said tire.

The foregoing specification signed at Seattle, Wash., this 27th day of October, 1931.

ALVIN H. SHOEMAKER.